H. HERTZBERG.
MARINE COMPASS.
APPLICATION FILED MAY 31, 1907.

1,022,785.

Patented Apr. 9, 1912.

WITNESSES
O. C. Abbott
V. E. Nichols

INVENTOR
Harry Hertzberg
BY
ATTORNEYS

COLUMBIA PLANOGRAPH CO., WASHINGTON, D. C.

UNITED STATES PATENT OFFICE.

HARRY HERTZBERG, OF BROOKLYN, NEW YORK, ASSIGNOR TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

MARINE COMPASS.

1,022,785.     Specification of Letters Patent.     Patented Apr. 9, 1912.

Original application filed August 14, 1906, Serial No. 330,613. Divided and this application filed May 31, 1907. Serial No. 376,730.

*To all whom it may concern:*

Be it known that I, HARRY HERTZBERG, a citizen of the United States, residing in the city of New York, borough of Brooklyn, county of Kings, and State of New York, have invented a certain new and useful Marine Compass, of which the following is a specification.

The subject matter of this application is a division of a prior application filed by me on Aug. 14, 1906, Serial No. 330,613, for an invention appertaining to "steering apparatus for marine vessels, torpedoes, and the like."

The invention is a compass for use in connection with, or as a part of, a system for steering marine vessels, torpedoes, and any or all classes of marine craft.

The object of this invention is to oppose sudden movements and fluctuations of a magnetic needle, whereby a marine compass is rendered dead beat. This object is accomplished by establishing eddy currents in a mass of non-magnetic metal by the movement of a magnetic needle adjacent to or within said metallic mass, said eddy currents opposing the magnetic lines of force of the needle and tending to overcome sudden fluctuation thereof.

My new apparatus is a dry or non-liquid dead-beat mariners' compass which is provided with means for opening and closing a helm-controlling electrical circuit in a manner to shift the helm of a vessel or other marine craft automatically, whereby the craft is steered on a predetermined course.

In the accompanying drawings, I have illustrated one practical embodiment of the invention but the construction shown therein is to be understood as illustrative only, and not as defining the limits of the invention.

Figure 1:
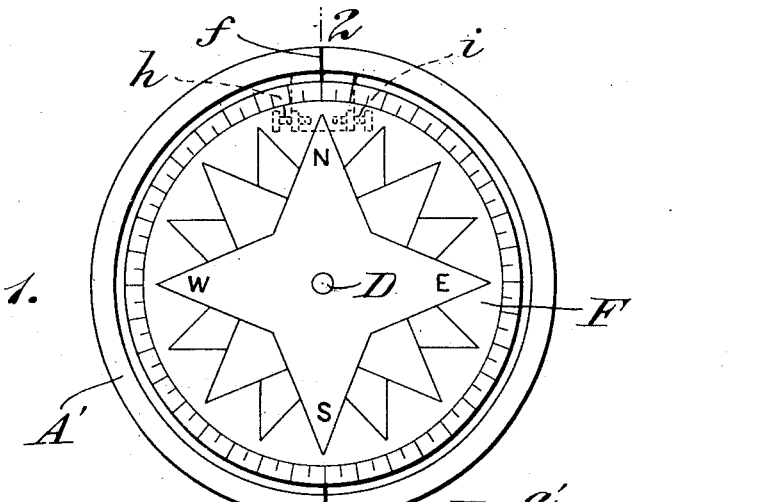
Figure 2:
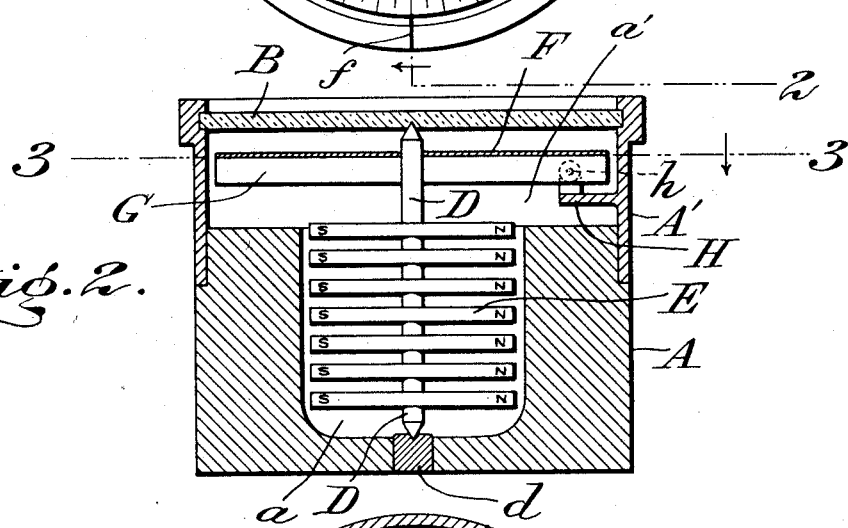
Figure 3:
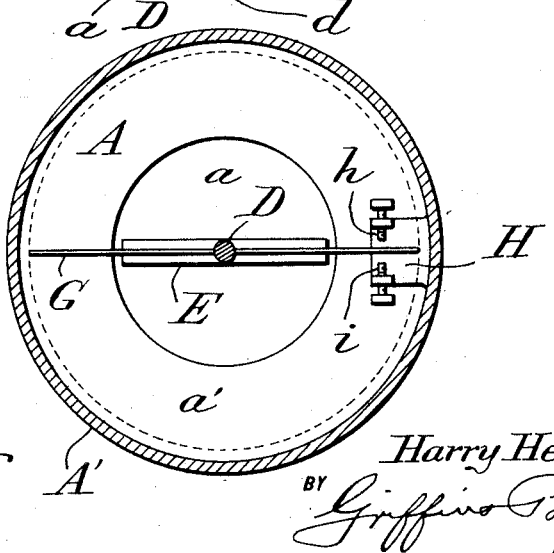

Figure 1 is a plan view of my non-liquid mariner's compass. Fig. 2 is a vertical section on the line 2—2 of Fig. 1. Fig. 3 is a horizontal section on the line 3—3 of Fig. 2.

The box or casing of the new compass consist of the elements, A, A′, united one to the other in a suitable way for the purpose of producing a substantially fluid tight casing for the operative parts of the instrument.

An important element of the compass consists in the employment of a mass of metal adapted to generate eddy currents which are opposed to the magnetism of the magnetic needle. It is preferred to embody such a mass of metal in the construction of the element, A, of the compass box. As shown, said element, A, is composed of a solid body of metal, preferably of copper, and in this metallic mass is a cavity or chamber, $a$. The section or member, A′, of the box is a relatively thin shell, composed of suitable material, such as brass, and it is provided with a transparent cover, B, such as glass. At the bottom of the cavity or chamber, $a$, is a bearing, $d$, adapted to receive the lower pointed end of a staff, D, said bearing being composed of a different material from the metallic mass, A. Said staff, D, extends centrally through the chamber, $a$, and into the chamber, $a'$, which is formed by the member, A′, and the cover, B, the upper pointed end of said staff terminating in a bearing which is provided in the cover, B.

The magnetic needle of my compass consists of a plurality of magnets, E, and a dial, F. Each magnet consists of a flat metal bar which is energized to produce north and south magnetic poles. Any desired number of said permanent magnets may be employed, but as shown in Fig. 2, a sufficient number of said magnets are mounted on the staff, D, to extend, practically, from the bottom to the top of the chamber, $a$, in the metallic mass, A. The magnets are secured centrally on the staff so that the weight thereof is distributed uniformly on the respective sides of said staff, and said magnets are adapted to sweep quite close to the walls of the chamber, $a$, of the metallic mass, A.

The dial, F, is secured firmly on the staff, so as to lie below the top, B, and operate in the chamber, $a'$, of the box or casing. Said dial is composed of suitable material, such as metal, paper, celluloid, or the like; and, furthermore, it is provided with a chart inscribed with the cardinal points of the compass, the steering points, and the degrees of a circle. The dial is adapted to coöperate with suitable index marks on the casing or box, such as the "lubber lines," $f$, shown in Fig. 1.

The compass herein described is adapted for the automatic operation of the helm controlling mechanism by the provision of means whereby the branches of an electrically operated circuit may be opened and closed by the deviation of the magnetic needle from the predetermined course of the vessel. As shown the staff, D, carries a circuit controller, G, in the form of a switch member or bar, the latter being secured to said staff for rotation therewith when it is turned by the deflection of the magnetic needle. Said switch element operates between the terminals, $h$, $i$, which are included in the respective branches of a helm-controlling circuit (not shown). The wires or conductors of said circuit are led through the box or casing in a suitable way so as to make connection with the terminals, $h$, $i$. Said terminals are supported in the chamber, $a'$, by a shelf or bracket, H, the latter being rigid with the casing, $A'$.

When the staff, D, and the magnetic needle are turned, the permanent magnets, E, move with the staff, and as such magnets operate within the mass of metal, A, such movement thereof sets up or establishes eddy currents in the mass of copper, A, which eddy currents move in an opposite direction to the movement of the permanent magnets, whereby the magnets are retarded and the magnetic needle is rendered dead-beat.

The movement of the controller, G, in one direction by the magnetic needle brings said controller in contact with one of the terminals, $h$, for closing one branch of the electric circuit, thus operating means whereby the helm of a vessel, or other marine craft, is shifted in one direction. A movement of the controller in an opposite direction by a change in the position of the magnetic needle, causes the controller to make contact with the other terminal, $i$, thus operating mechanism for shifting the helm in a corresponding direction.

It will be understood that the deviation of the craft from a predetermined course is comparatively slight for the reason that the compass acts automatically to operate the steering mechanism, whereby the helm is shifted in one direction or the other for keeping the vessel or other craft on the prescribed course.

It is evident that the compass is to be mounted or supported in an appropriate manner, and that provision should be made for operating it by hand when desired.

Having thus fully described the invention, what I claim as new and desire to secure by Letters Patent, is:—

1. A marine compass comprising a casing, one part of said casing being composed of a mass of metal having a well therein, a staff, a magnetic needle carried thereon, said needle being composed of a plurality of magnetic bars, a controller carried by the staff, and circuit terminals in said casing adapted to be contacted by said controller, substantially as described.

2. A marine compass comprising a casing, a portion of said casing being a mass of metal having a well therein, a staff, a magnetic needle carried by said staff, said needle being composed of a series of superimposed magnetized bars, said bars operating in said well, a circuit controlling member carried by said staff, and terminals carried by said casing adapted to be contacted by said controller, substantially as described.

3. A marine compass comprising a box, one part of which is composed of a mass of metal having a well therein, and the other part of which comprises a shell fitting on said first-named part, a staff having a bearing in the bottom of the well, a magnetic needle comprising a series of superimposed magnetized bars mounted on the staff, said magnetic needle operating in said well, a bracket on said second named box part, a pair of contacts carried by said bracket, a switch bar carried by the staff and oscillatory between said contacts, a dial carried by the staff, and a cover provided with index marks.

In testimony whereof I have signed my name to this specification in the presence of two subscribing witnesses.

HARRY HERTZBERG.

Witnesses:
R. C. R. BINDER,
JOSEPH F. GARCIO.

---

Copies of this patent may be obtained for five cents each, by addressing the "Commissioner of Patents, Washington, D. C."